(12) United States Patent
He et al.

(10) Patent No.: US 11,234,555 B2
(45) Date of Patent: Feb. 1, 2022

(54) SMART COOKING DEVICE AND METHOD

(71) Applicants: Hefei BOE Vision-Electronic Technology Co., Ltd., Anhui (CN); BOE TECHNOLOGY GROUP CO., LTD., Beijing (CN)

(72) Inventors: Kai He, Beijing (CN); Jie Yang, Beijing (CN); Zhenhua Li, Beijing (CN)

(73) Assignees: HEFEI BOE VISION-ELECTRONIC TECHNOLOGY CO., LTD., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/398,047

(22) Filed: Apr. 29, 2019

(65) Prior Publication Data
US 2020/0100621 A1 Apr. 2, 2020

(30) Foreign Application Priority Data

Sep. 28, 2018 (CN) .......................... 201811140918.0

(51) Int. Cl.
*A47J 36/32* (2006.01)
*A47J 27/00* (2006.01)
(Continued)

(52) U.S. Cl.
CPC ............ *A47J 36/32* (2013.01); *A47J 27/004* (2013.01); *A47J 43/24* (2013.01); *A47J 47/01* (2013.01)

(58) Field of Classification Search
CPC .......... A47J 36/30; A47J 27/004; A47J 43/24; A47J 47/01
See application file for complete search history.

(56) References Cited

U.S. PATENT DOCUMENTS 4,147,811 A * 4/1979 Abe .................. A23C 20/025
426/634
4,649,810 A * 3/1987 Wong .................. A47J 36/32
99/326
(Continued)

FOREIGN PATENT DOCUMENTS

CN 2161212 Y 4/1994
CN 2569711 Y 9/2003
(Continued)

OTHER PUBLICATIONS

Chinese Office Action dated Jun. 2, 2020, from application No. 201811140918.0.

*Primary Examiner* — Steven N Leff
(74) *Attorney, Agent, or Firm* — Thomas | Horstemeyer, LLP

(57) ABSTRACT

A smart cooking device and method are disclosed in the present disclosure. The smart cooking device includes a controller, a food material vessel, a storage vessel, a water storage vessel, a motor and a lifting and translating apparatus. The food material vessel is configured to store a food material and is provided with a first valve. The storage vessel is provided with a second valve. The water storage vessel is configured to accommodate a liquid to clean the food material. The motor is configured to be capable of driving the storage vessel to rotate according to the control of the controller. The lifting and translating apparatus is connected with the storage vessel and configured to be capable of moving according to the control of the controller thus to drive the storage vessel to move to the food material vessel, the water storage vessel or a cooking apparatus.

13 Claims, 2 Drawing Sheets

(51) Int. Cl.
*A47J 43/24* (2006.01)
*A47J 47/01* (2006.01)

(56) References Cited

U.S. PATENT DOCUMENTS

| | | | |
|---|---|---|---|
| 2004/0173103 A1* | 9/2004 | Won | A47J 37/1228 |
| | | | 99/326 |
| 2011/0072984 A1* | 3/2011 | Chen | A23C 20/025 |
| | | | 99/483 |
| 2013/0340628 A1* | 12/2013 | Cheng | A23L 11/07 |
| | | | 99/353 |
| 2017/0280763 A1* | 10/2017 | Nazarian | A21C 15/002 |

FOREIGN PATENT DOCUMENTS

| | | |
|---|---|---|
| CN | 101596066 A | 12/2009 |
| CN | 204306629 U | 5/2015 |
| CN | 205849221 U | 1/2017 |
| JP | H02-246909 A | 10/1990 |
| KR | 100908665 B1 | 7/2009 |

\* cited by examiner

SMART COOKING DEVICE AND METHOD

CROSS-REFERENCE TO RELATED APPLICATIONS

The present application claims the priority to Chinese application No. 201811140918.0, filed on Sep. 28, 2018, which is incorporated herein by reference in its entirety.

TECHNICAL FIELD

The present disclosure relates to the field of smart homes, more particularly, to a smart cooking device and method.

BACKGROUND

With the development of science and technology and the improvement of material living standards, great convenience has been brought to people's lives by the application of various smart appliances. Wherein, the development of smart kitchen appliances, especially the development of cooking apparatuses of smart electric cookers etc. have received more and more attention.

Existing smart cooking device has been capable of performing automatic food material cleaning by smart appointment or remote control and to cook such as steaming and boiling. However, it is still necessary for the user to measure the food material in advance according to experience or recipes and put them into a cooking apparatus. In the case of steaming and boiling porridge/rice as an example, the process of both measuring the rice and adding water etc. before the timing automatic steaming and boiling require manual operation by the user. In such a manner, on the one hand, the user's "cooking skill" is tested, and the accurate quantification of the food material cannot be achieved. On the other hand, the automation of the whole cooking process cannot be achieved, and the convenience is lacking.

Therefore, there is a need to provide a smart cooking device and method that enables automatic measuring, cleaning and cooking food material.

SUMMARY

The present disclosure is to provide a smart cooking device and method that can achieve automatic measuring, cleaning and cooking food material.

In one aspect of the present disclosure, a smart cooking device is provided. The smart cooking device includes a controller, a food material vessel, a storage vessel, a water storage vessel, a motor and a lifting and translating apparatus. The food material vessel is configured to store a food material and provided with a first valve which is configured to be capable of being turned on or turned off according to a control of the controller. The storage vessel is provided with a second valve which is configured to be capable of being turned on or turned off according to the control of the controller. The water storage vessel is configured to accommodate a liquid to clean the food material in the storage vessel. The motor is configured to be capable of driving the storage vessel to rotate according to the control of the controller. The lifting and translating apparatus is connected with the storage vessel and configured to be capable of moving according to the control of the controller thus to drive the storage vessel to move to the food material vessel, the water storage vessel or a cooking apparatus.

In some arrangements, the controller includes a processor, and one or more of a storage module, an input module and a wireless transmission module, the lifting and translating apparatus, the first valve, the motor, the second valve and the cooking apparatus are controlled by the processor according to cooking data stored in the storage module, cooking data received by the input module or cooking data received by the wireless transmission module. Adopting this preferred manner, automatic cooking based on reservation setting, automatic cooking based on field setting or automatic cooking based on remote control can be achieved by the smart cooking device provided by the first aspect of the present disclosure, and the convenience extent is higher.

In some arrangements, the input module includes one or more of a voice input module, a button and a touch screen. Adopting this preferred manner, control commands to the controller can be performed by the user in the field through buttons and/or touch screen operation of the controller or by voice.

In some arrangements, the first valve and the second valve are pneumatic valve respectively, the lifting and translating apparatus includes a pneumatic translation arm and a pneumatic raising and lowering rod, the pneumatic translation arm and the pneumatic raising and lowering rod are connected with the storage vessel thus to drive the storage vessel to translate or raise and lower. Pneumatic control manner is response faster and more accurate than hydraulic and electric control manner.

In some arrangements, there are a plurality of food material vessels stored different food materials respectively, each food material vessel is provided with one first valve, and at least one first valve is capable of being controlled by the controller to turned on or turned off.

In some arrangements, the food material vessel and the storage vessel are both funnel-shaped, the first valve is disposed at a bottom of the food material vessel, and the second valve is disposed at a bottom of the storage vessel.

In some arrangements, a plurality of pipelines disposed in parallel are further included, one end of the pipelines is correspondingly connected with the plurality of first valves, and the other end of the plurality of pipelines is combined to form one outlet, the food material can be entered the mesh-shaped vessel via the pipeline and the outlet when the first valve is turned on. Adopting this preferred manner, it is convenient to control the lifting and translating apparatus to drive the storage vessel to move to the food material vessel.

In some arrangements, the smart cooking device further includes a water adding apparatus, the water adding apparatus includes a water pipe, the water pipe is provided with a third valve, and the water pipe is connected with the lifting and translating apparatus, the water pipe is moved to the water storage vessel or the cooking apparatus by the driving of the lifting and translating apparatus under the control of the controller, the third valve is turned on under the control of the controller to inject water into the water storage vessel or the cooking apparatus.

In some arrangements, the smart cooking device further includes a seasoning vessel for storing a seasoning, the seasoning vessel is provided with a fourth valve that is configured to turned on according to the control of the controller to allow the seasoning to enter the cooking apparatus.

In some arrangements, there are a plurality of seasoning vessels stored different seasonings respectively, each seasoning vessel is provided with one fourth valve, and at least one fourth valve is capable of being controlled by the controller to turned on or turned off.

In addition to steaming and boiling porridge/rice, many cooking manners are needed to add seasoning during the cooking process. Adopting such manner, automatic adding seasoning can be achieved.

In some arrangements, the cooking apparatus is provided with a liquid level sensor and/or a pressure sensor. However, in order to ensure that the cooking apparatus starts cooking when the food material and water to be added and the like, which have not been all added to the cooking apparatus is not due to estimation errors, the liquid level sensor and/or the pressure sensor are provided in the cooking apparatus in this preferred manner. By sensing whether the amount of the added water and the total weight of the added food material and the water meet the requirements in the cooking data, which is as another kind start condition of starting the cooking apparatus.

In another aspect of the present disclosure, a smart cooking method based on the smart cooking device is provided. The smart cooking method includes controlling the lifting and translating apparatus to drive the storage vessel to move to the food material vessel. The smart cooking method includes controlling the first valve to turn on according to a cooking data to allow the food material to enter the storage vessel. The smart cooking method includes controlling the lifting and translating apparatus to drive the storage vessel to move to the water storage vessel. The smart cooking method includes controlling the motor to drive the storage vessel to rotate to clean the food material in the storage vessel. The smart cooking method includes controlling the lifting and translating apparatus to drive the storage vessel to move to the cooking apparatus. The smart cooking method includes controlling the second valve to turn on to allow the food material in the storage vessel to enter the cooking apparatus. The smart cooking method includes controlling the cooking apparatus to cook according to the cooking data.

The smart cooking method provided by the second aspect of the present disclosure can automatically measure, clean and cook the food material, and achieve the automation of the whole cooking process.

BRIEF DESCRIPTION OF THE DRAWINGS

A detailed description of the particularly arrangements of the present disclosure is further described below in conjunction with the accompanying drawings.

DETAILED DESCRIPTION

Figure 1:
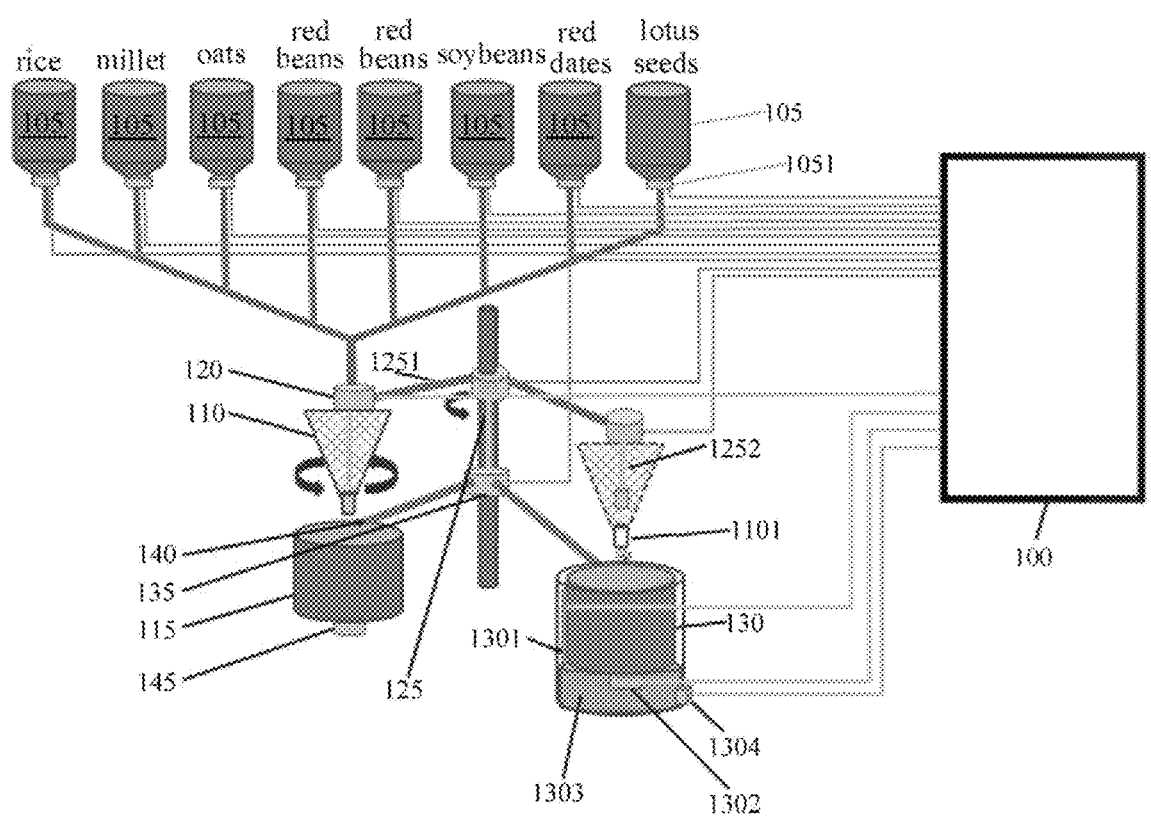
FIG. 1 is a schematic diagram of a smart cooking device in according to an arrangement of the present disclosure.

In order to explain the present disclosure more clearly, the present disclosure will be further described in conjunction with the preferred arrangements and the accompanying drawings. Similar components in the accompanying drawings are denoted by the same reference numerals. It can be understood by those skilled in the art that the content particularly described below is illustrative and not restrictive, and the protection scope of the present disclosure should not be limited thus.

As shown in FIG. 1, a smart cooking apparatus is provided by an arrangement of the present disclosure. The smart cooking apparatus includes a controller 100, a plurality of food material vessels 105 storing different food materials respectively, a storage vessel 110, a water storage vessel 115, a motor 120, a lifting and translating apparatus 125 and a cooking apparatus 130. The food material vessel 105 is provided with a first valve 1051, and the storage vessel 110 is provided with a second valve 1101. Wherein the motor 120 is fixedly connected on the lifting and translating apparatus 125, and the storage vessel 110 is fixedly connected with an output shaft of the motor 120.

The lifting and translating apparatus 125 is controlled to move the storage vessel 110 to the food material vessel 105 and at least one first valve 1051 is controlled to turn on by the controller 100, such that at least one kind food material is entered the storage vessel 110. It can be understood that the initial position of the storage vessel 110 can also be set at the food material vessel 105. The lifting and translating apparatus 125 is controlled to drive the storage vessel 110 to move into the water storage vessel 115 and the motor 120 is controlled to drive the storage vessel 110 to rotate to clean the food material in the storage vessel 110. It can be understood that the mesh of the storage vessel 110 can restrict the food material in the storage vessel 110 from leaking out but the water can flow into for cleaning. The lifting and translating apparatus 125 is controlled to drive the storage vessel 110 to move to the cooking apparatus 130 and the second valve 1101 is controlled to turn on, such that the food material in the storage vessel 110 is entered the cooking apparatus 130. The cooking apparatus 130 is controlled to cook.

The smart cooking apparatus provided by the present arrangement can automatically measure, clean and cook the food material, and achieve the automation of the whole cooking process. The smart cooking apparatus provided by the present arrangement is particularly suitable for the whole process automatic steaming and boiling porridge/rice. In addition to this, the smart cooking apparatus provided by the present arrangement can be performed a variety of other forms of cooking according to the setting of the kind of the selected food material, the setting of the selected each food material weight ratio, the setting of the cooking mode of the cooking apparatus 130 and the setting of the parameters of the cooking duration and the heating temperature etc. in the setting cooking mode. In summary, the smart cooking apparatus provided by the present arrangement has comprehensive functions and high extent of convenience.

For the kind of food material, taking steaming and boiling porridge/rice as an example, the food material includes but not limited to rice, millet, oats, red beans, mung beans, soybeans, red dates, lotus seeds, and the food material vessel 105 includes food material vessels for storing rice, millet, oats, red beans, mung beans, soybeans, red dates, lotus seeds, as shown in FIG. 1.

In some optional implementation manners of the present arrangement, the controller 100 includes a processor, and one or more of a storage module, an input module and a wireless transmission module. The lifting and translating apparatus 125, the first valve 1051, the motor 120, the second valve 1101 and the cooking apparatus 130 are controlled by the processor according to the cooking data stored in the storage module, the cooking data received by the input module or the cooking data received by the wireless transmission module. It can be understood that the controller 100 can be provided separately or integrated into the cooking apparatus 130 such as a smart electric cooker. Adopting this implementation manner, automatic cooking based on a reservation setting, automatic cooking based on a field setting or automatic cooking based on a remote control can be achieved by the smart cooking apparatus provided by the present arrangement, and the extent of convenience is higher. Further, the input module includes one or more of a voice input module, a button and a touch screen. In this way, control commands can be performed to the controller 100 by the user through operating the buttons and/or the touch screen of the controller 100 or through voice. Wherein the cooking data includes selecting the kind of the food material, the weight ratio of each selected food material, the added water amount of the cooking apparatus 130, the cooking start time of the cooking apparatus 130, the cooking mode as well as the parameters of cooking duration and the heating temperature etc. in the cooking mode. It can be understood that the cooking start time in the cooking data stored in the storage module can achieve the reservation cooking, which can be set through the input module or the wireless transmission module.

The turn on duration of the corresponding first valve 1051 can be controlled by the controller 100 according to the kind of the selected food material and the weight ratio of each selected food material, so that the corresponding food material of the setting weight could be entered the storage vessel 110. For example, the aperture of the first valve 1051 of the food material vessel 105 storing the foodstuff kind food material is 1 cm, then the weight of the food material flowing out in one second is 10 g when the first valve 1051 is in turned on state. If mung bean 50 g and rice 100 g are needed, the first valve 1051 of the food material vessel 105 storing the mung bean is turned on by the controller 100, and turned off after five seconds; the first valve 1051 of the food material vessel 105 storing the rice is turned on, and turned off after ten seconds.

In some optional implementation manners of the present arrangement, the first valve 1051 and the second valve 1101 are pneumatic valves, respectively. The lifting and translating apparatus 125 includes a pneumatic translation arm 1251 and a pneumatic raising and lowering rod 1252. Pneumatic control manner is faster and more accurate than hydraulic and electric control manner. It can be understood that, in this implementation manner, a gas source should also be provided to achieve pneumatic control.

In some optional implementation manners of the present arrangement, the food material vessel 105 and the storage vessel 110 are funnel-shaped, respectively. The first valve 1051 is disposed at the bottom of the food material vessel 105, and the second valve 1101 is disposed at the bottom of the storage vessel 110. The funnel-shaped food material vessel 105 and the storage vessel 110 are easy to achieve the outflow of the food material in the vessel. And it is easy to measure the flow rate of the food material when the valve is turned on. It helps to precisely control the weight of the outflow food material by controlling the turn on duration of the valve.

In some optional implementation manners of the present arrangement, the first valves 1051 of the plurality of food material vessels 105 are corresponded to one end of a plurality of pipes disposed in parallel, respectively, the other end of the plurality of pipes are combined to form an outlet, as shown in FIG. 1. Adopting this implementation manner, it is convenient to control the lifting and translating apparatus 125 to drive the storage vessel 110 to move to the food material vessel 105. It can be understood that a relatively large funnel can also be placed underneath all of the food material vessels 105. In addition, the lifting and translating apparatus 125 can also be controlled to drive the storage vessel 110 to move to the food material vessel 105 storing the food material required for cooking.

In some optional implementation manners of the present arrangement, the smart cooking device further includes a water adding apparatus, and the water adding apparatus includes a water inlet valve 135 and a water pipe 140.

The lifting and translating apparatus 125 is controlled by the controller 100 to drive the water pipe 140 to move to the water storage vessel 115 or the cooking apparatus 130, and the water inlet valve 135 is controlled to turn on to inject water into the water storage vessel 115 or the cooking apparatus 130.

Adopting this implementation manner, automatic adding water of the water storage vessel 115 and the cooking apparatus 130 can be achieved. It can be understood that the movement translation of the water pipe 140 and the storage vessel 110 may be synchronization or may also be out of synchronization, as long as the need to clean the food materials and the need of the process of adding water during cooking are met by the movement of the water pipe 140. In addition, a water outlet valve 145 may be disposed at the bottom of the water storage vessel 115, and the water outlet valve 145 is controlled by the controller 100 to turn on to automatically discharge the cleaning water after cleaning the food material. Wherein the water inlet valve 135 and the water outlet valve 145 are electrically controlled valves, respectively.

In some optional implementation manners of the present arrangement, the smart cooking device further includes a plurality of seasoning vessels (not shown in the figure) that storing different seasonings respectively, and the seasoning vessel is provided with a seasoning valve.

At least one seasoning valve is controlled by the controller 100 to turn on to allow at least one kind seasoning to enter the cooking apparatus 130.

In addition to steam and boil porridge/rice, many cooking manners are needed to add seasoning during the cooking process. Adopting such manner, automatic adding seasoning can be achieved. In this implementation manner, the cooking data further includes the kind of the used seasoning, the weight ratio of each used seasoning and the timing at which each used seasoning is added to the cooking apparatus 130. Similar to controlling the weight ratio of the food material, the turn on duration of the corresponding fourth valve can be controlled by the controller 100 according to the kind of the used seasoning and the weight ratio of each used seasoning, and determining the turn on timing of the seasoning valve corresponding to each used seasoning according to the timing of the starting cooking. In addition, the seasoning valve is also preferably adopted a pneumatic valve.

In some optional implementation manners of present arrangement, the cooking apparatus 130 is provided with a liquid level sensor 1301 and/or a pressure sensor 1302. The cooking apparatus 130 can be controlled to start cooking by the controller 100 based on the cooking data by estimating the duration of the food material being measured and washed. However, in order to ensure that the occurrence of fortuitous event of cooking apparatus 130 starts cooking when the water to be added and the like which have not been all added to the cooking apparatus 130 is not due to estimation errors, deviations in the movement of the lifting and translating apparatus 125 or other malfunctions, the liquid level sensor 1301 and/or the pressure sensor 1302 are provided in the cooking apparatus 130 in this implementation manner. By sensing whether the amount of the added water, the total weight of the added food material and the water etc. meet the requirements in the cooking data, which is as an auxiliary judgment condition of whether or not the cooking preparation work has been completed. In addition, the cooking apparatus 130 is further provided with a heating apparatus 1303, and a manual timing input apparatus 1304 may also be provided.

The general workflow of the smart cooking device provided by the present arrangement is as follows:

An instruction of "cooking a three-person mung bean porridge at 17:00 pm" is input by the user through the voice input module, the button, the touch screen of the controller 100 or the user's mobile terminal;

The instruction is first parsed by the controller 100, and the cooking data is obtained by the manner of searching for a pre-stored or cloud recipe database etc. The cooking data including: mung bean 50 g, rice 100 g and water 2 L are needed, the cooking mode is boiled, the cooking duration is 30 minutes, the cooking start-up time is 16:30 pm and the start-up time for "measuring food material" is estimated to be 16:25 pm;

Thereafter, at 16:25, the lifting and translating apparatus 125 is controlled by the controller 100 to drive the storage vessel 110 to move to the food material vessel 105. The first valve 1051 of the food material vessel 105 storing the mung bean is turned on and is turned off after five seconds. The first valve 1051 of the food material vessel 105 storing the rice is turned on and is turned off after ten second. 50 g mung beans and 100 g rice are placed into the storage vessel 110;

Thereafter, the lifting and translating apparatus 125 is controlled by the controller 100 to drive the water pipe 140 to move to the water storage vessel 115. The water inlet valve 135 is controlled to turn on for 10 seconds to add water to the water storage vessel 115. Then the lifting and translating apparatus 125 is controlled to drive the storage vessel 110 to move into the water storage vessel 115. The motor 120 is controlled to drive the storage vessel 110 to rotate to clean the mung bean and the rice in the storage vessel 110. After the cleaning is completed, the outlet water valve 145 is turned on to discharge the cleaning water in the water storage vessel 115;

Thereafter, the lifting and translating apparatus 125 is controlled to drive the storage vessel 110 and the water pipe 140 to synchronously move to the cooking apparatus 130. The second valve 1101 of the storage vessel 110 is controlled to turn on, such that the mung beans and rice in the storage vessel 110 being entered the cooking apparatus 130. The inlet valve 135 is controlled to turn on for fifteen seconds to add 2 L of water to the cooking d apparatus 130. At this point, the preparation work for cooking has been completed;

Finally, an auxiliary determination of whether the preparation work has been completed is performed by the controller 100 according to the output signals of the liquid level sensor 1301 and/or the pressure sensor 1302 at 16:30. If so, the cooking apparatus 130 is immediately controlled to cook for thirty minutes in the manner of boil.

Figure 2:
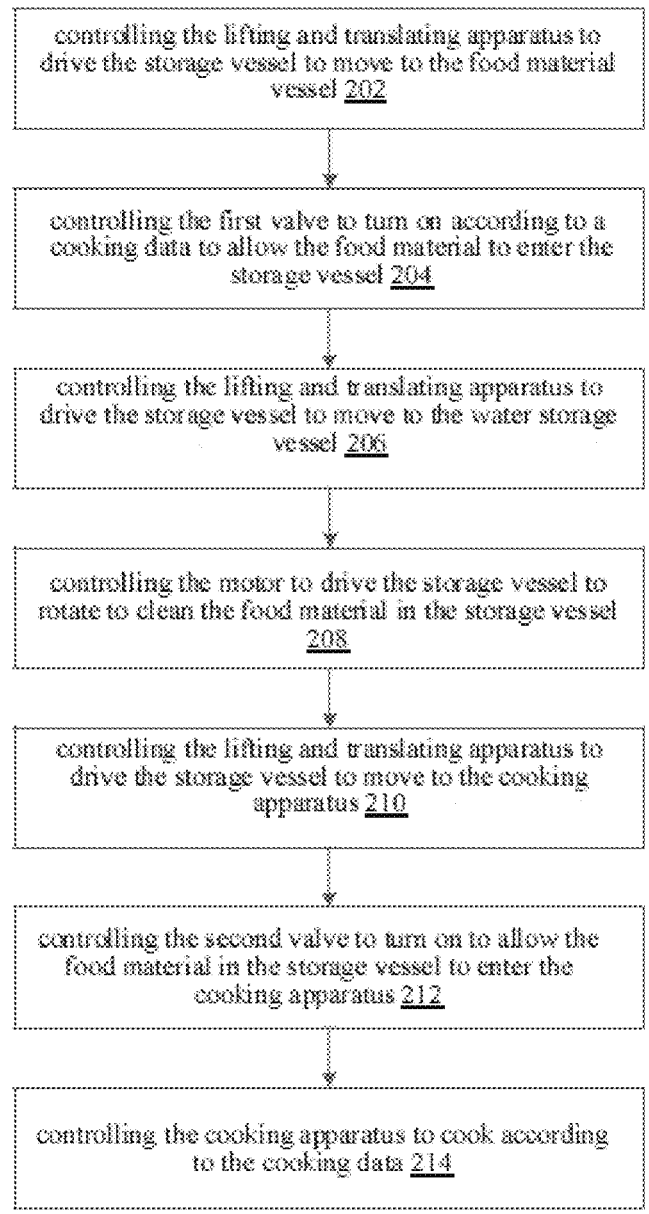
FIG. 2 is a flow chart of a smart cooking method in according to an arrangement of the present disclosure.

As shown in FIG. 2, a smart cooking method based on the above described smart cooking device is provided in another arrangement of the present disclosure, including the following blocks.

The smart cooking method can include controlling the lifting and translating apparatus to drive the storage vessel to move to the food material vessel (BLOCK 202).

The smart cooking method can include controlling at least one first valve to turn on according to the cooking data, such that at least one kind of food material is entered the storage vessel (BLOCK 204).

The smart cooking method can include controlling the lifting and translating apparatus to drive the storage vessel to move to the water storage vessel (BLOCK 206).

The smart cooking method can include controlling the motor to drive the storage vessel to rotate to clean the food material in the storage vessel (BLOCK 208).

The smart cooking method can include controlling the lifting and translating apparatus to drive the storage vessel to move to the cooking apparatus (BLOCK 210).

The smart cooking method can include controlling the second valve to turn on, such that the food material in the storage vessel is entered the cooking apparatus (BLOCK 212).

The smart cooking method can include controlled the cooking apparatus to cook according to the cooking data (BLOCK 214).

The smart cooking method provided by the present arrangement can automatically measure, clean and cook the food material, and achieve the automation of the whole cooking process.

It should be noted that the smart cooking method provided by the present arrangement is similar to the principle and workflow of the above described smart cooking device. For related points, reference may be made to the above described description, and details are not described herein again.

In the description of the present disclosure, it should be noted that the orientation or position relationship denoted by the terms "upper", "lower" etc. are based on the orientation or position relationship shown in the accompanying drawings, and are only for the convenience of describing the present disclosure and simplifying the description, other than indicating or implying that the apparatus or component referred to must have a particular orientation, configured and operated in a particular orientation. Therefore, it should not be understood as the limitation of the present disclosure. Unless otherwise expressly stated and limited, terms "installation", "connected" and "connection" can be understood broadly. For example, it may be a fixed connection or may be a detachable connection or an integral connection. It may be a mechanical connection or also an electrical connection. It may be directly connected or indirectly connected through an intermediate medium. It may be the internal connection between two components. The particular meanings of the above terms in the present disclosure can be understood according to the particular circumstances by those skilled in the art.

It should also be noted that in the description of the present disclosure, relationship terms such as first and second are used merely to distinguish one entity or operation from another entity or operation. It does not necessarily require or imply any such actual relationship or order between these entities or operations. Moreover, the term "including", "containing" or any other variation thereof are intended to cover non-exclusive inclusions. Thus, such that the process, method, article or device including a series of elements not only includes those elements but also includes other elements that are not explicitly listed, or also includes elements inherent to such process, method, article or device. Without more restrictions, an element defined by the statement "includes one . . . " is not excluded that there are additional identical elements in the process, method, article or device that comprise the described elements.

It is apparent that the above described arrangements of the present disclosure are merely examples for clearly explaining the present disclosure, and are not intended to limit the arrangements of the present disclosure. Other variations or modifications of different forms may be made by those skilled in the art based on the above described description. It is not possible to exhaust all arrangements herein. Any obvious variations or modifications arising from the technical solution of the present disclosure are still within the protection scope of the present disclosure.

What is claimed is:

1. A smart cooking device, comprising:
   a controller;
   a food material vessel configured to store a food material, the food material vessel being provided with a first valve configured to turn on and turn off according to a control of the controller;
   a storage vessel provided with a second valve configured to turn on and turn off according to the control of the controller, the second valve being disposed at a bottom of the storage vessel;
   a water storage vessel configured to accommodate a liquid to clean the food material in the storage vessel;
   a motor configured to drive the storage vessel to rotate according to the control of the controller; and
   a lifting and translating apparatus comprising a pneumatic translation arm and a pneumatic raising and lowering rod, the pneumatic translation arm and the pneumatic raising and lowering rod being connected to the storage vessel, and configured to move according to the control of the controller to drive the storage vessel to translate, raise, and lower, as a whole, to move to the food material vessel, the water storage vessel, or a cooking apparatus.

2. The smart cooking device according to claim 1, wherein the controller comprises a processor, and one or more of a storage module, an input module and a wireless transmission module, the lifting and translating apparatus, the first valve, the motor, the second valve and the cooking apparatus are controlled by the processor according to cooking data stored in the storage module, cooking data received by the input module or cooking data received by the wireless transmission module.

3. The smart cooking device according to claim 2, wherein the input module comprises one or more of a voice input module, a button, and a touch screen.

4. The smart cooking device according to claim 1, wherein the first valve and the second valve are pneumatic valves, respectively.

5. The smart cooking device according to claim 1, wherein there are a plurality of food material vessels stored different food materials respectively, each of the plurality of food material vessels is provided with one first valve, and at least one first valve is capable of being controlled by the controller to turned on or turned off.

6. The smart cooking device according to claim 5, further comprising a plurality of pipelines disposed in parallel, wherein:
   the first valve is one of a plurality of first valves; and
   a first end of each of the plurality of pipelines is correspondingly connected with the plurality of first valves, and a second end of each of the plurality of pipelines is combined to form a single outlet, such that the food material can be entered into mesh of the storage vessel via the pipelines and the single outlet when the first valve is turned on.

7. The smart cooking device according to claim 1, wherein the food material vessel and the storage vessel are both funnel-shaped, the first valve is disposed at a bottom of the food material vessel, and the second valve is disposed at a bottom of the storage vessel.

8. The smart cooking device according to claim 1, wherein the smart cooking device further comprises a water adding apparatus, the water adding apparatus comprises a water pipe, the water pipe is provided with a third valve, and the water pipe is connected with the lifting and translating apparatus, the water pipe is moved to the water storage vessel or the cooking apparatus by the driving of the lifting and translating apparatus under the control of the controller, the third valve is turned on under the control of the controller to inject water into the water storage vessel or the cooking apparatus.

9. The smart cooking device according to claim 1, wherein the smart cooking device further comprises a seasoning vessel for storing a seasoning, the seasoning vessel is provided with a fourth valve that is configured to turned on according to the control of the controller to allow the seasoning to enter the cooking apparatus.

10. The smart cooking device according to claim 9, wherein there are a plurality of seasoning vessels stored different seasonings respectively, each seasoning vessel is provided with one fourth valve, and at least one fourth valve is capable of being controlled by the controller to turned on or turned off.

11. The smart cooking device according to claim 1, wherein the cooking apparatus is provided with at least one of: a liquid level sensor and a pressure sensor.

12. A smart cooking method based on a smart cooking device, comprising:
   providing the smart cooking device that comprises:
      a controller;
      a food material vessel configured to store a food material, provided with a first valve configured to turn on and turn off according to a control of the controller;
      a storage vessel provided with a second valve configured to turn on and turn off according to the control of the controller, the second valve being disposed at a bottom of the storage vessel;
      a water storage vessel configured to accommodate a liquid to clean the food material in the storage vessel;
      a motor configured to drive the storage vessel to rotate according to the control of the controller; and
      a lifting and translating apparatus comprising a pneumatic translation arm and a pneumatic raising and lowering rod, the pneumatic translation arm and the pneumatic raising and lowering rod being connected to the storage vessel, and configured to move according to the control of the controller thus to drive the storage vessel to translate, raise, and lower, as a whole, to move to the food material vessel, the water storage vessel, or a cooking apparatus;
   controlling the lifting and translating apparatus to drive the storage vessel to move to the food material vessel;
   controlling the first valve to turn on according to a cooking data to allow the food material to enter the storage vessel;
   controlling the lifting and translating apparatus to drive the storage vessel to move to the water storage vessel;
   controlling the motor to drive the storage vessel to rotate to clean the food material in the storage vessel;
   controlling the lifting and translating apparatus to drive the storage vessel to move to the cooking apparatus;
   controlling the second valve to turn on to allow the food material in the storage vessel to enter the cooking apparatus; and
   controlling the cooking apparatus to cook according to the cooking data.

13. The smart cooking method according to claim 12, wherein:
- the smart cooking device further comprises a plurality of food material vessels configured to store different food materials, respectively;
- each of the plurality of food material vessels is provided with a first valve, and the first valve is controlled by the controller to be turned on or off; and
- controlling the first valve to turn on according to the cooking data to allow the food material to enter the storage vessel comprises controlling the first valve to turn on according to the cooking data to allow at least one food material to enter the storage vessel.

* * * * *